G. JACIUK.
COMBINED MOP AND SCRUBBER
APPLICATION FILED AUG. 11, 1920.

1,397,584.

Patented Nov. 22, 1921.
2 SHEETS—SHEET 1.

George Jaciuk
INVENTOR.

BY
ATTORNEYS.

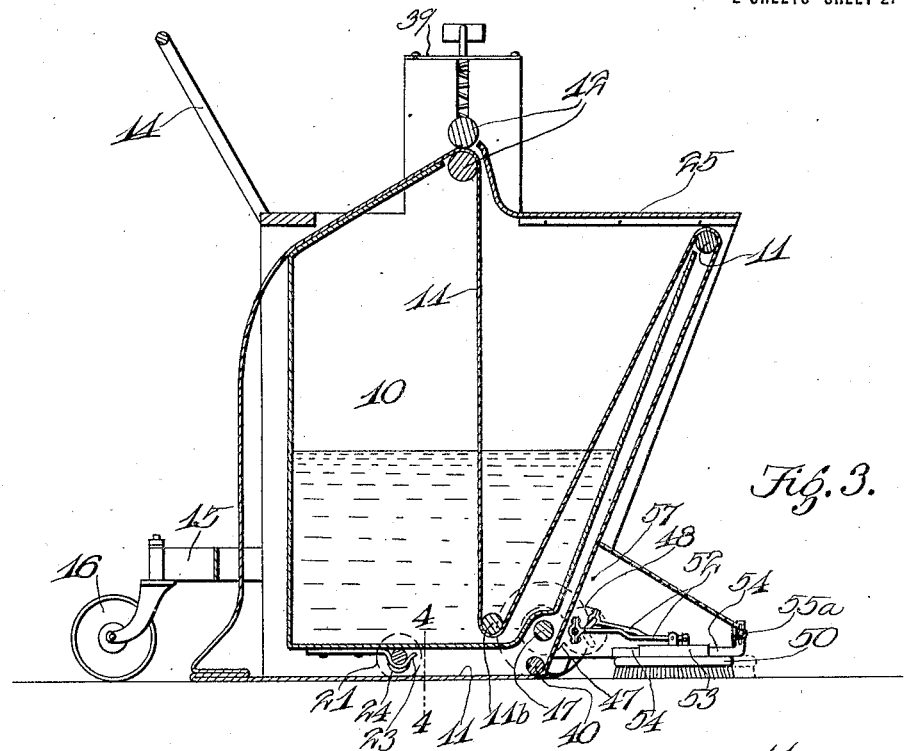
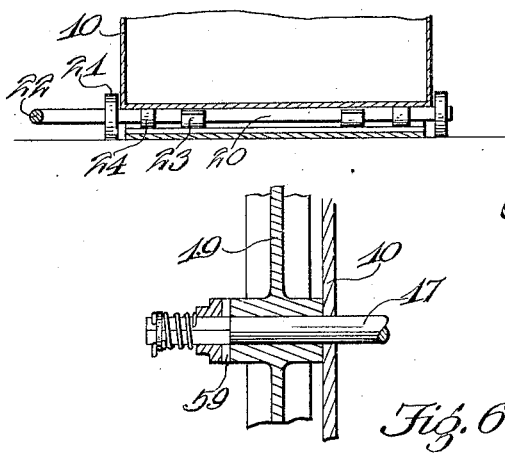
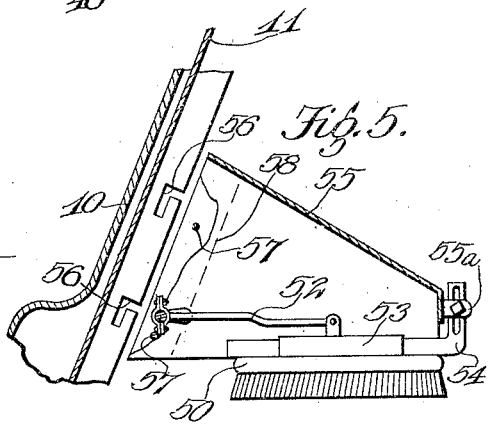

UNITED STATES PATENT OFFICE.

GEORGE JACIUK, OF CHICAGO, ILLINOIS.

COMBINED MOP AND SCRUBBER.

1,397,584. Specification of Letters Patent. Patented Nov. 22, 1921.

Application filed August 11, 1920. Serial No. 402,793.

*To all whom it may concern:*

Be it known that I, GEORGE JACIUK, a citizen of the United States, residing at Chicago, in the county of Cook and State of Illinois, have invented new and useful Improvements in Combined Mops and Scrubbers, of which the following is a specification.

This invention relates to machines for mopping and scrubbing floors and other surfaces, and its object is to provide a novel and improved power-driven machine of this kind in which the scrubber unit is detachable so that the machine may be used for mopping operations alone.

The invention also has for its object to provide novel and improved supporting means for the mop whereby adjustments of the latter are readily effected.

Other objects and advantages of the invention will be pointed out in the detailed description appearing hereinafter, and in order that the same may be better understood, reference is had to the accompanying drawings forming a part of this specification.

The preferred embodiment of the invention has been disclosed, but it will be understood that various changes and modifications may be made without a departure from the spirit and scope of the invention as claimed hereinafter.

In the drawings,

Fig. 3 is a central longitudinal section;

Fig. 4 is a sectional detail on the line 4—4 of Fig. 3;

Fig. 5 is an enlarged sectional detail of a scrubber element, and

Fig. 6 is an enlarged sectional detail on the line 6—6 of Fig. 2.

Figure 1:
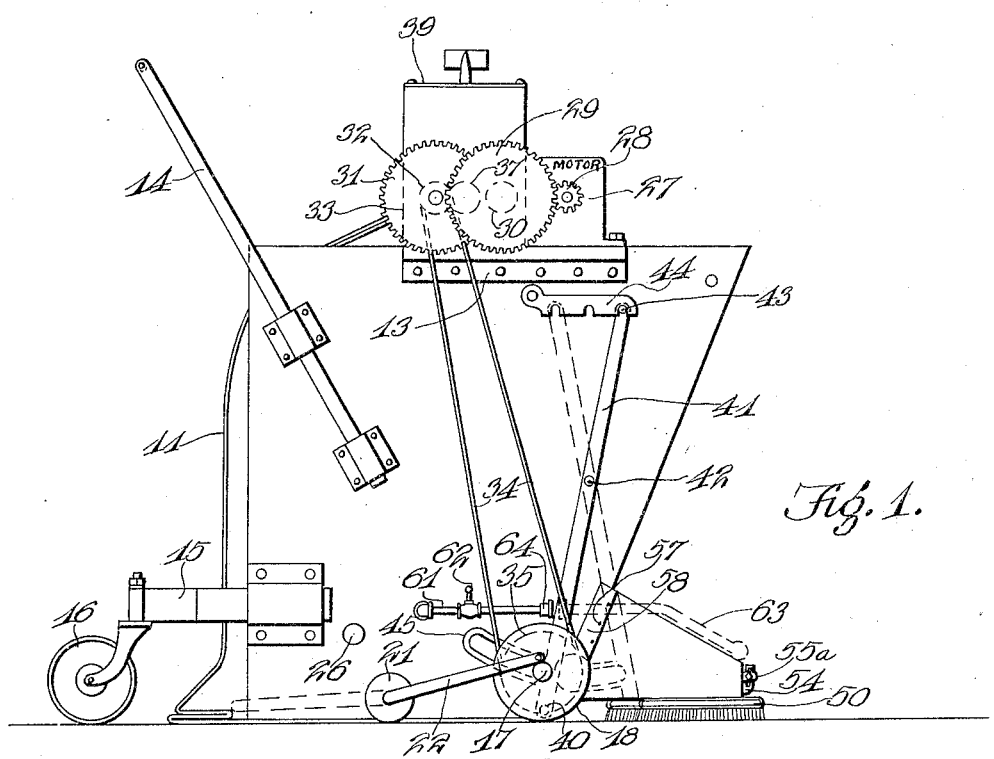
Figure 1 is a side elevation of the machine.
Figure 2:
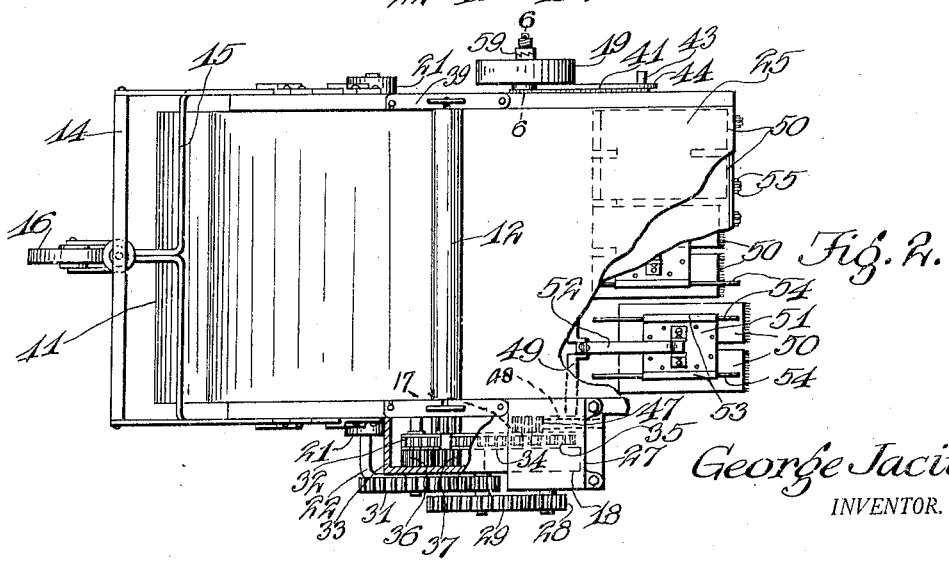
Fig. 2 is a plan view thereof, partly broken away.

Referring specifically to the drawings, 10 denotes a tank or other suitable receptacle adapted to hold a supply of water as shown in Fig. 3. An endless mop 11 is positioned and supported to travel through the tank and to dip into the water therein. The mop enters the tank through an opening in the front wall, near the top thereof, and passes over a guide roller 11$^a$ positioned adjacent to said opening, from which latter the mop passes downward to enter the water, and after passing over a guide roller 11$^b$ located in the tank near the bottom thereof, it passes upwardly and enters between wringer rollers 12 located adjacent to an exit opening in the top of the tank. The mop then extends rearwardly down the inclined top of the tank, and hangs loosely to the rear of the tank, from which it extends forwardly to lie beneath the tank on the floor or other surface to be operated on. Beneath the tank bottom, at the forward end thereof, the mop passes over a guide roller 40, and then extends upwardly, in front of the tank to the guide roller 11$^a$. The wringer mechanism to be presently described is mounted in supports 13 on the tank.

The tank 10 is mounted on wheels and it is adapted to be manually guided, a push handle 14 being provided for this purpose. From the rear end of the tank extends a frame 15 supporting a caster wheel 16. The forward end of the tank carries an axle shaft 17 having wheels 18 and 19 at its ends. The wheel 18 is fast on the axle shaft, whereas the wheel 19 is loose on said shaft, a pawl-and-ratchet driving connection 59 being provided, so that the wheel may slip when making a turn. This is a well-known expedient, and hence a further description thereof is not necessary.

The mop 11 lies flat on the floor or other surface to be operated on, with the bottom of the tank 10 close to the mop. The tank may, however, be elevated sufficiently to permit the mop to be shifted or removed, and in order that this may be conveniently done, a rock shaft 20 is mounted on the bottom of the tank and equipped with wheels 21 at its ends, and a crank arm 22 at one end for operating the shaft from the full to the dotted line position in Fig. 1. The tank rests on the shaft, and the latter is held thereto by spring clips 23. The shaft has lifting cams or eccentrics 24 which act to lift the tank when the shaft is rocked by swinging the arm 22 rearwardly as shown dotted in Fig. 1, the spring clips 23 permitting this movement. The tank is now supported intermediate its ends, and the mop may be shifted or mended as desired.

The tank 10 has a lid 25 at the front, and a plug 26 near the bottom for the discharge of its contents.

The top of the tank 10 carries an electric motor 27 on the shaft of which is a pinion 28 which meshes with a spur gear 29, on the shaft of which latter is a pinion 30 which is in mesh with a spur gear 31. These gears and pinions are suitably supported by brackets or other devices carried by the tank, and said brackets also support a housing 33 into which the shaft of the gear 31 extends, said shaft carrying, inside the housing 33, a sprocket wheel 32 which is connected by a chain 34 to a sprocket wheel 35 on the shaft 17 alongside the wheel 18. The shaft of sprocket wheel 32 also carries a pinion 36 which is in mesh with a pinion 37 on the lower wringer roller 12. The wringer supports 13 have swing plates 39 at the top to permit removal of the upper roller and its spring.

It will be evident from the foregoing that the motor 27 propels the machine, and also operates the wringer. A scrubber to be presently described is also operated by the motor.

The bottom front guide roller 40 for the mop 11 is intended to be moved forwardly at certain times, and in order that this may be done, it is supported by two levers 41 pivoted at 42 on the side walls of the tank 10. These levers have outstanding pins 43 at the top to be hooked at any of two or three positions by pivoted latch plates 44, said plates having notches to seat the pins. Opposite axle shaft 17, the levers 41 have looped offsets 45 to move in a curve with the axle shaft extending thereinto as a guide. Dotted lines in Fig. 1 show the levers 41 swung to advance the roller 40. This draws the mop 11 forwardly, taking up the slack at the rear, and bringing the mop to a better position to reach corners, it being understood that the scrubbing brushes 50 and the other parts associated therewith are now not employed, they having been removed from the machine. The mop and the scrubbing brushes may be used together, or the mop alone may be used.

The scrubbing mechanism comprises brushes 50 and a means for reciprocating the same, which will now be described:

Next to the sprocket wheel 35 is a pinion 47 adapted to come in mesh with a pinion 48 on a crank shaft 49 having pitman connections 52 with the brushes 50, the latter being arranged in a row transversely of the machine. The cranks are set at different angles to actuate the brushes alternately. Each brush 50 is held by a top plate 51 to which the pitman is connected. The plate 51 has a sleeve pocket 53 slidable on a guide bar 54 carried by a supporting member 55, said member having ears 55ª in front to which the upturned slotted forward extremity of the bar is bolted as shown in Figs. 3 and 5, the slot permitting vertical adjustment and corresponding adjustment of the brush.

The hereinbefore described scrubber unit is detachably connected to the tank 10 so that it may be removed if the mop alone is to be used. In order that this may be done, the shaft 49 is also carried by the supporting member 55. This member is hung on the forwardly extending edges of the side walls of the tank 10, said edges having angular slots 56 to seat pins 57 extending between the side walls of the member 55, and said member also has outer plates or flanges 58 overlapping the tank side walls aforementioned. When the supporting member is attached, the pinion 48 comes in mesh with the pinion 47, and the scrubbing unit is now ready for use.

The side of the tank 10 has an outlet 61 provided with a valve 62 and leading to a suitable water feed 63 to discharge in front of the scrubbing unit, a coupling 64 being provided to permit separation when the unit is to be removed.

I claim:

1. In a combined mopping and scrubbing machine, a mop, a traveling support for the mop, propelling means for said support, a vertically adjustable scrubbing unit detachably connected to the support, and a driving connection between the propelling means and the scrubbing unit.

2. In a combined mopping and scrubbing machine, a mop, a traveling support for the mop, propelling means for said support, reciprocatory scrubbing brushes, a support for said brushes detachably connected to the mop support, a crank shaft carried by the support for the brushes and having driving connections with the brushes, and a driving connection between the propelling means and the crank shaft.

3. In a combined mopping and scrubbing machine, a mop, a traveling support for the mop, propelling means for said support, reciprocatory scrubbing brushes, guides on which the brushes are slidably mounted, a support for the guides detachably connected to the mop support, and means for driving the brushes from the propelling means.

4. In a combined mopping and scrubbing machine, a mop, a traveling support for the mop, propelling means for said support, reciprocatory scrubbing brushes, guides on which the brushes are slidably mounted, a support for the guides detachably connected to the mop support, a crank shaft carried by the guide support and having driving connections with the brushes, and a driving connection between the propelling means and the crank shaft.

In testimony whereof I affix my signature.

GEORGE JACIUK.